(12) United States Patent
Kwon et al.

(10) Patent No.: US 11,746,168 B2
(45) Date of Patent: Sep. 5, 2023

(54) OLEFIN POLYMER AND PREPARATION METHOD THEREOF

(71) Applicant: LG Chem, Ltd., Seoul (KR)

(72) Inventors: Oh Joo Kwon, Daejeon (KR); Sol Cho, Daejeon (KR); Seung Ki Park, Daejeon (KR); Ki Soo Lee, Daejeon (KR); Heon Yong Kwon, Daejeon (KR); Dae Sik Hong, Daejeon (KR); Sung Hyun Park, Daejeon (KR); Sung Ho Park, Daejeon (KR); Jin Young Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/541,434

(22) Filed: Dec. 3, 2021

(65) Prior Publication Data

US 2022/0089797 A1 Mar. 24, 2022

Related U.S. Application Data

(62) Division of application No. 16/318,259, filed as application No. PCT/KR2017/008180 on Jul. 28, 2017, now abandoned.

(30) Foreign Application Priority Data

Dec. 20, 2016 (KR) .................. 10-2016-0174938

(51) Int. Cl.
| | |
|---|---|
| C08F 4/6592 | (2006.01) |
| C08F 210/16 | (2006.01) |
| C08L 23/08 | (2006.01) |
| C08F 4/659 | (2006.01) |
| C08F 210/14 | (2006.01) |
| C08J 5/18 | (2006.01) |

(52) U.S. Cl.
CPC ........ *C08F 210/16* (2013.01); *C08F 4/65904* (2013.01); *C08F 4/65916* (2013.01); *C08F 4/65925* (2013.01); *C08F 4/65927* (2013.01); *C08F 210/14* (2013.01); *C08J 5/18* (2013.01); *C08L 23/0815* (2013.01); *C08F 4/65912* (2013.01); *C08F 2500/03* (2013.01); *C08F 2500/08* (2013.01); *C08F 2500/09* (2013.01); *C08F 2500/11* (2013.01); *C08F 2500/12* (2013.01); *C08F 2500/18* (2013.01); *C08F 2500/26* (2013.01); *C08J 2323/08* (2013.01)

(58) Field of Classification Search
CPC .............. C08F 4/65904; C08F 4/65925; C08F 4/65927; C08F 210/16
See application file for complete search history.

(56) References Cited

U.S. PATENT DOCUMENTS

| | | |
|---|---|---|
| 6,258,912 B1 | 7/2001 | Howard et al. |
| 6,476,171 B1 | 11/2002 | Lue et al. |
| 6,956,088 B2 | 10/2005 | Farley et al. |
| 9,309,337 B2 | 4/2016 | Soulages et al. |
| 2006/0046048 A1 | 3/2006 | Kapur et al. |
| 2010/0317904 A1 | 12/2010 | Small et al. |
| 2012/0010375 A1 | 1/2012 | Yang et al. |
| 2013/0090433 A1 | 4/2013 | Jiang et al. |
| 2014/0094582 A1 | 4/2014 | Nomura et al. |
| 2014/0128563 A1 | 5/2014 | McDaniel et al. |
| 2015/0126692 A1 | 5/2015 | Sukhadia et al. |
| 2015/0175726 A1 | 6/2015 | McDaniel et al. |
| 2016/0272798 A1 | 9/2016 | Cheng et al. |
| 2017/0101491 A1 | 4/2017 | Ishihama et al. |
| 2017/0145123 A1 | 5/2017 | Sukhadia et al. |
| 2017/0320978 A1 | 11/2017 | Jeong et al. |
| 2018/0223009 A1 | 8/2018 | Kim et al. |
| 2018/0306694 A1 | 10/2018 | Park et al. |
| 2019/0085100 A1 | 3/2019 | Song et al. |

FOREIGN PATENT DOCUMENTS

| | | |
|---|---|---|
| CN | 1121730 A | 5/1996 |
| CN | 102958948 A | 3/2013 |
| CN | 103709297 A | 4/2014 |
| CN | 103946246 A | 7/2014 |
| CN | 106068287 A | 11/2016 |
| CN | 108350110 A | 7/2018 |
| DE | 69534436 T2 | 2/2006 |
| EP | 0877051 A1 | 11/1998 |
| EP | 0719287 B1 | 12/1999 |
| EP | 3348585 A1 | 7/2018 |
| EP | 3476869 A1 | 5/2019 |
| JP | 2010229214 A | 10/2010 |
| JP | 2013122013 A | 6/2013 |
| KR | 20050102099 A | 10/2005 |
| KR | 20120035164 A | 4/2012 |
| KR | 20130113322 A | 10/2013 |
| KR | 20160029704 A | 3/2016 |
| KR | 20160076415 A | 6/2016 |
| KR | 20170112184 A | 10/2017 |
| WO | 9425523 A1 | 11/1994 |
| WO | 9504761 A1 | 2/1995 |
| WO | 1998033844 A1 | 8/1998 |

OTHER PUBLICATIONS

Chinese Search Report for Application No. 201780048742.3, dated Jan. 25, 2021, pp. 1-3.
Extended European Search Report including Written Opinion for Application No. EP17883346.3, dated Aug. 8, 2019, pp. 1-10.
Extended European Search Report including Written Opinion for Application No. EP17884614.3, dated Jun. 24, 2019, pp. 1-10.
Search Report from Chinese Office Action for Application No. 2017800479516 dated Jul. 16, 2020; 2 pages.
Search report from International Application No. PCT/KR2017/008178, dated Dec. 12, 2017.

(Continued)

*Primary Examiner* — Caixia Lu
(74) *Attorney, Agent, or Firm* — Lerner David LLP

(57) ABSTRACT

The present disclosure provides an olefin polymer having excellent film processability and physical properties, and a preparation method of the same.

18 Claims, No Drawings

(56) References Cited

OTHER PUBLICATIONS

Search report from International Application No. PCT/KR2017/008180, dated Dec. 15, 2017.
Yang, Qing, et. al., "Alternative View of Long Chain Branch Formation by Metallocene Catalysts." Macromolecules, vol. 43, Revised Aug. 12, 2010, pp. 8836-8852.

OLEFIN POLYMER AND PREPARATION METHOD THEREOF

CROSS-REFERENCE TO RELATED APPLICATIONS

The present application is a divisional application of U.S. application Ser. No. 16/318,259 filed Jan. 16, 2019, a national phase entry under 35 U.S.C. § 371 of International Application No. PCT/KR2017/008180 filed Jul. 28, 2017, which claims priority from Korean Patent Application No. 10-2016-0174938 filed Dec. 20, 2016, all of which are incorporated herein by reference.

TECHNICAL FIELD

The present disclosure relates to an olefin polymer having excellent film processability and physical properties, and a preparation method of the same.

BACKGROUND OF ART

A linear low density polyethylene (LLDPE) is produced by copolymerizing ethylene and an alpha olefin using a polymerization catalyst under low pressure. Thus, this is a resin having a narrow molecular weight distribution and a certain length of a short chain branch (SCB), without a long chain branch (LCB). LLDPE film has high strength at break and elongation in addition to the properties of a general polyethylene and exhibits excellent tear strength, falling weight impact strength or the like. The feature of LLDPE has led to an increase in the use of a stretch film, an overlapping film or the like which is difficult to apply existing low density polyethylene or high density polyethylene. However, LLDPE has poor processability for a blown film compared to excellent mechanical properties. A blown film is a film produced by a method of blowing air into a molten plastic and inflating it, which is also called an inflation film.

As factors to be taken into consideration when processing a blown film, foam stability, processing load, or the like must be considered, and especially, the foam stability should be considered important. The foam stability means a property that, when the film is produced by injecting air into the molten plastic, the produced film maintains its shape without being torn, which is associated with a melt strength (MS).

The melt strength refers to a strength for maintaining a shape capable of withstanding the molding and processing in a softened and melted state. The melt strength of low density polyethylene (LDPE) is higher than that of LLDPE. This is because in the case of LDPE, branched chains are entangled with each other as compared to LLDPE, which is more advantageous in withstanding the molding and processing. Therefore, in order to complement the melt strength of LLDPE, a method of producing a film by blending LDPE has been proposed. However, this method has a problem of significantly reducing the mechanical properties of conventional LLDPE even when a very small amount of LDPE is added.

Therefore, a method of improving the processability of the film by introducing LCB into LLDPE has been proposed, but the deterioration of the film properties has not been solved yet.

DETAILED DESCRIPTION OF THE INVENTION

Technical Problem

The present disclosure is to provide an olefin polymer having excellent film processability and physical properties.

The present disclosure is to provide a preparation method of the same.

Technical Solution

According to one embodiment of the present disclosure, an olefin polymer satisfying the following conditions (a) to (f) is provided:

(a) a density: 0.910 g/cm$^3$ to 0.930 g/cm$^3$ (b) a melt index (measured according to ASTM D1238 at a temperature of 190° C. under a load of 2.16 kg): 0.5 g/10 min to 1.5 g/10 min (c) a content of a branched polymer structure: 1 to 7 wt % based on the total weight of the olefin polymer (d) a weight average molecular weight of main chain in a branched polymer structure: 100,000 to 600,000 g/mol (e) the number of long chain branch in a branched polymer structure: 0.005 to 0.010 per 1000 carbon atoms in the olefin polymer (f) a weight average molecular weight of long chain branch in a branched polymer structure: 15,000 to 45,000 g/mol.

Specifically, the olefin polymer may have a melt strength measured at 190° C. of 70 mN or more.

In addition, the olefin polymer may have a MFRR (21.6/2.16) of 20 or more and less than 40, wherein MFRR (21.6/2.16) is a value that the melt flow rate (MFR$_{21.6}$) measured at a temperature of 190° C. under a load of 21.6 kg according to ISO 1133 is divided by the melt flow rate (MFR$_{2.16}$) measured at a temperature of 190° C. under a load of 2.16 kg according to ISO 1133.

In addition, the olefin polymer may have a weight average molecular weight of 90,000 g/mol to 600,000 g/mol.

In addition, the olefin polymer may have a polydispersity index of 1 to 3.

In addition, the olefin polymer may be a copolymer of ethylene and an alpha-olefin.

In addition, the alpha-olefin of the olefin polymer may be selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

According to another embodiment of the present disclosure, a preparation method of the above-mentioned olefin polymer is provided, the method including the step of polymerizing olefinic monomers in the presence of a supported catalyst, wherein the supported catalyst includes a support, and a first transition metal compound represented by the following Chemical Formula 1 and a second transition metal compound represented by the following Chemical Formula 2 which are supported on the support in a weight ratio of 1:0.1 to 1:1:

[Chemical Formula 1]

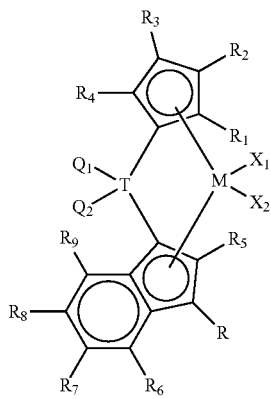

in Chemical Formula 1,

M is Ti, Zr or Hf, $X_1$ and $X_2$ are the same as or different from each other, and are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, T is C, Si, Ge, Sn or Pb, $Q_1$ and $Q_2$ are the same as or different from each other, and are each independently selected from the group consisting of hydrogen, halogen, a C1 to C20 alkyl group, a C2 to C20 heterocycloalkyl group, a C1 to C20 alkoxy group, a C2 to C20 alkoxyalkyl group, a C1 to C20 carboxylate, and a C2 to C20 alkenyl group, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and $R_1$ to $R_9$ are the same as or different from each other, and are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group,

[Chemical Formula 2]

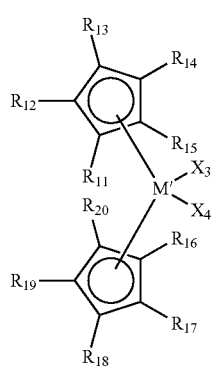

in Chemical Formula 2,

M' is Ti, Zr or Hf, $X_3$ and $X_4$ are the same as or different from each other, and are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, and $R_{11}$ to $R_{20}$ are the same as or different from each other, and are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, or one or more pairs of neighboring substituents of $R_{11}$ to $R_{20}$ may be connected with each other to form a substituted or unsubstituted aliphatic or aromatic ring.

Specifically, in the Chemical Formula 1 of the first transition metal compound, R may be selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, $R_1$ to $R_4$ may be the same as or different from each other, and may each independently be hydrogen, or a C1 to C20 alkyl group, and $R_5$ to $R_9$ may be hydrogen.

More specifically, in the first transition metal compound, R may be a C1 to C10 alkyl group, $R_1$ to $R_4$ may be the same as or different from each other, and may each independently be hydrogen, or a C1 to C10 alkyl group, and $R_5$ to $R_9$ may be hydrogen.

In addition, the second transition metal compound may be a compound represented by the following Chemical Formula 2a:

[Chemical Formula 2a]

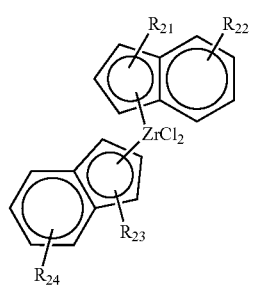

in Chemical Formula 2a, $R_{21}$ to $R_{24}$ are the same as or different from each other, and are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group.

In addition, in the preparation method, the support may include one or more selected from the group consisting of silica, alumina, and magnesia.

In addition, in the preparation method, the olefinic monomers may be ethylene and alpha-olefin.

Advantageous Effects

The olefin polymer according to the present disclosure may exhibit excellent film processability as well as physical properties, since the polymer is prepared by using a hybrid supported catalyst including different kinds of specific transition metal compounds so that the content of the branched structure in the polymer, the weight average molecular weight of the main chain in the branched structure, the weight average molecular weight and number of the long chain branch (LCB) are optimized. Accordingly, it can be useful as a raw material for various products requiring excellent mechanical strength and high processability. In particular, the excellent processability of the olefin polymer makes it possible to produce a stable film during the production of the film by a melt blown process, and thus the polymer may be useful as a raw material for the product produced by the melt blown process.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

While the present invention is susceptible to various modifications and alternative forms, specific embodiments thereof are shown by way of example and will herein be described in detail. It should be understood, however, that these are not intended to limit the invention to the particular form disclosed, but on the contrary, the intention is to cover all modifications, equivalents and alternatives falling within the spirit and scope of the present invention.

Hereinafter, the olefin polymer and the preparation method of the same according to the exemplary embodiments of the present disclosure will be described in more detail.

Polymer properties such as rheological properties or molecular weight distribution are greatly influenced by structural parameters such as polymer shape, weight average molecular weight and polydispersity index. Generally, a polymer is classified into a linear polymer or a branched polymer according to its shape. The linear polymer refers to a form in which monomers constituting a polymer are linearly combined to form a main chain. In addition, a polymer structure in which various kinds of chains are branched from a linear polymer and has a long chain branch (LCB) is referred to as a branched polymer. Physical properties of such branched polymers differ greatly depending on the molecular weight, distribution and the number of LCB. Therefore, it is important to confirm the existence of the long chain branch which has a great influence on the physical properties of the polymer and accurately measure the structure thereof in order to analyze the physical properties of the polymer.

In this regard, in the production of an olefin polymer of the present disclosure, film processability and physical properties of the polymer may be simultaneously improved by using a hybrid supported catalyst including different kinds of specific transition metal compounds so that the content of the branched structure in the polymer, the weight average molecular weight of the main chain in the branched structure, the weight average molecular weight and number of the long chain branch are controlled.

According to an embodiment of the present disclosure, an olefin polymer satisfying the following conditions (a) to (f) is provided:

(a) a density: 0.910 g/cm$^3$ to 0.930 g/cm$^3$ (b) a melt index (measured according to ASTM D1238 at a temperature of 190° C. under a load of 2.16 kg): 0.5 g/10 min to 1.5 g/10 min (c) a content of a branched polymer structure: 1 to 7 wt % based on the total weight of the olefin polymer (d) a weight average molecular weight of main chain in a branched polymer structure: 100,000 to 600,000 g/mol (e) the number of long chain branch in a branched polymer structure: 0.005 to 0.010 per 1000 carbon atoms in the olefin polymer (f) a weight average molecular weight of long chain branch in a branched polymer structure: 15,000 to 45,000 g/mol.

In the present disclosure, "olefin polymer" includes mixtures of polymeric structures prepared by polymerization in a single polymerization system and having different shapes, such as linear or branched, mixed by physical force. In this case, the branched polymer structure may have a weight average molecular weight ratio of the side chain to the main chain of more than 0% and 40% or less, or a weight average molecular weight of only the side chain of 3,000 g/mol or more.

In the present disclosure, the content of the branched polymer structure contained in the olefin polymer, the weight average molecular weight of the main chain in the branched polymer structure, the number and the weight average molecular weight of long chain branch in the branched polymer structure may be analyzed by conventional methods using a GPC column analysis and a NMR analysis. However, present disclosure may use a quantitative analysis method of the polymer structure including the steps of measuring rheological property and/or molecular weight distribution of the arbitrarily selected polymer, assigning a random value to the selected polymer, and determining the value of the structural parameter of the polymer by predicting the rheological property and/or molecular weight distribution of the polymer and comparing the predicted value with the measured value. Specifically, the above method can be referred to the description of Korean Patent Application No. 2016-0038881.

More specifically, the quantitative analysis method of the polymer structure includes (A) measuring rheological property of the polymer; (B) selecting one or more parameter among the structural parameters that the polymer may have, and assigning a random value to the selected structural parameter; and (C) determining the value of the structural parameter of the polymer by predicting the rheological property of the polymer to which the random value is assigned, and comparing the predicted rheological property value of the polymer with the measured rheological property value of the polymer. Moreover, the step (A) may further include the step of measuring the molecular weight distribution of the polymer using GPC. In the quantitative analysis method of the polymer structure, the rheological property of the polymer may be measured using a rheometer. More specifically, the shear storage modulus (G'), the shear loss modulus (G''), and the shear complex viscosity ($\eta^*$) may be measured using a rotational rheometer.

In addition, the selected structural parameter of the step (b) may be one or more selected from the group consisting of a polymer shape; a weight average molecular weight (Mw) of the main chain or long chain branch in the branched polymer structure; a polydispersity index (PDI) of the main chain or long chain branch; and the number of long chain branch. The polymer shape parameter is a parameter capable of distinguishing whether the polymer to be analyzed is linear or branched. Specifically, it represents a parameter that can qualitatively distinguish the branched polymer that may appear in comblike, star, or H-shape depending on the side chains bonded to the branched polymer.

The structural parameter may further include a mass fraction between mixed polymers. For example, the weight average molecular weight and the polydispersity index parameter of each polymer in the polymer mixture can be calculated by multiplying the mass fraction parameter, and can be applied to the prediction of the rheological property and/or the molecular weight distribution in the step (C).

In addition, the rheological property of the polymer of the step (C) may be predicted by applying a step strain of shear flow to the polymer to which the random value is assigned, and analyzing the stress relaxation behavior of the polymer induced by the step strain. The stress relaxation behavior means a stress change behavior of the polymer with time when a step strain of the shear flow is applied to the polymer. It may vary depending on the length of the main chain and the side chain of the polymer, the molecular weight distribution and the hierarchically ordered structure, as well as the structure of the polymer. For example, when the step strain of the shear flow is applied to the polymer, the shape of the polymer is also deformed, and the length of the main chain and the side chain of the polymer, the molecular weight distribution and the hierarchically ordered structure may affect in the process of the relaxation of the polymer through the stress relaxation behavior with time. In one example, in the case of a general linear polymer having no side chain, the longer the main chain is, the larger the influence of the surrounding polymer is, and therefore the time required for the relaxation may be increased.

In the case of a polymer having a side chain, the relaxation time of the polymer may be longer than that of the linear polymer, because the main chain cannot be relaxed unless the side chain is relaxed.

In addition, the prediction of the rheological property from the stress relaxation behavior may be performed using a Doi-Edwards numerical analysis model.

The comparison of the predicted rheological property value of the polymer and the measured rheological property value of the polymer in the step (C) may be performed by calculating an error value ($\epsilon$) between the predicted rheological property value of the polymer and the measured rheological property value of the polymer, and confirming whether the error value is less than a predetermined error reference value ($\epsilon_s$). In the step (c), when the error value is less than the predetermined error reference value, the random value assigned in the step (B) may be the determined value of the polymer structure parameter. Moreover, the determined value may have a range expressed by a minimum value and a maximum value of a plurality of determined values derived by repeating the steps (B) and (C) two or more times. Or, it may have an average of the plurality of determined values derived by repeating the steps (B) and (C) two or more times.

In addition, the step (C) may further have a step of determining the value of the structural parameter of the polymer by predicting the molecular weight distribution of the polymer to which the random value is assigned, and comparing the predicted molecular weight distribution of the polymer with the measured molecular weight distribution of the polymer. The prediction of the molecular weight distribution of the polymer may be performed by assuming a log normal distribution to the polymer to which the random value is assigned.

The olefin polymer of the embodiment of the present disclosure may have a content of the branched polymer structure, which is measured according to the above-described method under the condition that the ranges of the density and the melt index are satisfied, of 1 to 7 wt %, more preferably 3 to 7 wt %, further more preferably 5 to 6 wt % based on the total weight of the olefin polymer.

In addition, the olefin polymer may have a weight average molecular weight of the main chain in the branched polymer structure of 100,000 to 600,000 g/mol, more preferably 100,000 to 550,000 g/mol, further more preferably 120,000 to 250,000 g/mol.

In addition, the olefin polymer may have the number of LCB in the branched polymer structure of 0.005 to 0.010, more preferably 0.006 to 0.010 per 1000 carbon atoms in the olefin polymer.

In addition, the olefin polymer may have a weight average molecular weight of LCB in the branched polymer structure of 15,000 to 45,000 g/mol, more preferably 17,000 to 41,000 g/mol.

When comparing the olefin polymers having an equivalent level of weight average molecular weight, as the content of the branched polymer structure in the olefin polymer and the weight average molecular weight of the main chain in the structure are high and the weight average molecular weight and the number of LCB are increased, the molecular entanglement is increased, and thereby the melt strength may be increased to exhibit excellent processability. In addition, as the content of the branched polymer structure and the number of LCB are low and the weight average molecular weight of the main chain in the branched polymer structure and the weight average molecular weight of LCB increase, the chain ends decrease, and thereby the tensile strength and drop impact strength may be increased to exhibit excellent physical properties.

The olefin polymer according to the present disclosure may simultaneously improve processability and physical properties by simultaneously satisfying the above-described range of conditions.

In addition, the olefin polymer of the embodiment of the present disclosure, which satisfies the above-mentioned structural parameter characteristics, may have a melt strength (MS) measured at 190° C. of 70 mN or more, more specifically 70 mN 100 mN.

In the present disclosure, a molten low density polyethylene copolymer is filled in a rheometer equipped with a capillary having an aspect ratio (30 mm in length/2 mm in diameter) of 15, and a shear rate is set to 72/s to prepare a strand, and then the melt strength may be measured by a method of measuring the force (mN) at the time of breakage while uniaxially stretching it with an accelerating wheel at an initial velocity of 18 mm/s and an acceleration of 12 mm/s$^2$. The measurement conditions are as follows.

capillary: length 30 mm, diameter 2 mm, shear rate 72/s
    wheel: initial velocity 18 mm/s, acceleration 12 mm/s$^2$ In addition, the olefin polymer according to the embodiment of the present disclosure may exhibit properties similar to LLDPE in order to maintain excellent mechanical properties of conventional LLDPE. For example, the olefin polymer may have a density measured according to ASTM D1505 of 0.910 g/cm³ to 0.930 g/cm³, more preferably 0.915 g/cm³ to 0.920 g/cm³.

In addition, the olefin polymer may have a melt index (MI) measured according to ASTM D1238 at a temperature of 190° C. under a load of 2.16 kg of 0.5 g/10 min to 1.5 g/10 min, more preferably 1 g/10 min to 1.5 g/10 min.

In addition, the olefin polymer may have MFRR (21.6/2.16) of 20 or more and less than 40, more preferably 20 to 30, wherein the MFRR (21.6/2.16) is a value that the melt flow rate ($MFR_{21.6}$) measured at a temperature of 190° C. under a load of 21.6 kg according to ISO 1133 is divided by the melt flow rate ($MFR_{2.16}$) measured at a temperature of 190° C. under a load of 2.16 kg according to ISO 1133.

In addition, the olefin polymer may have a weight average molecular weight (Mw) of 90,000 g/mol to 600,000 g/mol, more preferably 100,000 g/mol to 550,000 g/mol. Moreover, it may have a polydispersity index (PDI) of 1 to 3, more preferably 2.3 to 2.8, wherein PDI is determined by a ratio (Mw/Mn) of the number average molecular weight (Mn) to the weight average molecular weight (Mw) of the olefin polymer.

In the present disclosure, the weight average molecular weight (Mw) and the number average molecular weight (Mn) are converted values with respect to standard polystyrene measured by a gel permeation chromatography (GPC, manufactured by Water). However, the weight average molecular weight is not limited thereto, and may be measured by other methods known to those skilled in the art.

The olefin polymer of the embodiment may have at least one of the physical properties described above, and may have all of the properties described above to exhibit excellent mechanical strength. When the olefin polymer satisfies the content of the above-mentioned branched polymer structure, Mw of the main chain and Mw and the number of LCB, and at the same time, the above-mentioned density and the melt index like LDPE, as well as the range of MS, MFRR, the weight average molecular weight and the polydispersity index, the effect of improving the mechanical strength and processability may be more remarkable.

The olefin polymer exhibiting these properties may be, for example, a copolymer of ethylene and an alpha-olefin. Herein, the alpha-olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and a mixture thereof. Among them, the olefin polymer may be a copolymer of ethylene and 1-hexene. When the olefin polymer according to the embodiment is the above-described copolymer, the physical properties described above can be more easily acquired. However, the kind of the olefin polymer according to the embodiment is not limited thereto, and another various kinds known to those skilled in the art can be applied if they can exhibit the above-mentioned properties.

The blend of the linear olefin-based polymer and the branched olefin-based polymer produced respectively by the conventional polymerization reaction has heterogeneous characteristics and has poor mechanical properties as compared with a conventional linear olefin-based polymer. On the other hand, the present disclosure relates to an olefin polymer having a linear polymer structure and a branched polymer structure produced by a polymerization reaction in a single polymerization reaction system, which has homogeneous characteristics and has excellent mechanical properties equal to or higher than those of a conventional linear olefin polymer.

According to another embodiment of the present disclosure, a preparation method of the olefin polymer having above-mentioned physical properties is provided.

Specifically, the preparation method includes the step of polymerizing olefinic monomers in the presence of a supported catalyst, and the supported catalyst includes a support, and a first transition metal compound represented by the following Chemical Formula 1 and a second transition metal compound represented by the following Chemical Formula 2 which are supported on the support in a weight ratio of 1:0.1 to 1:1:

[Chemical Formula 1]

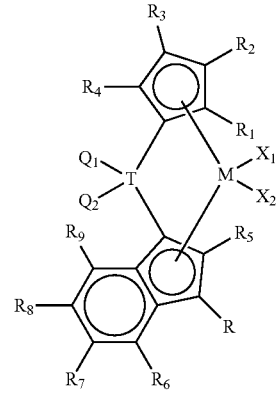

in Chemical Formula 1,

M is Ti, Zr or Hf, $X_1$ and $X_2$ are the same as or different from each other, and are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, T is C, Si, Ge, Sn or Pb, $Q_1$ and $Q_2$ are the same as or different from each other, and are each independently selected from the group consisting of hydrogen, halogen, a C1 to C20 alkyl group, a C2 to C20 heterocycloalkyl group, a C1 to C20 alkoxy group, a C2 to C20 alkoxyalkyl group, a C1 to C20 carboxylate, and a C2 to C20 alkenyl group, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and $R_1$ to $R_9$ are the same as or different from each other, and are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group,

[Chemical Formula 2]

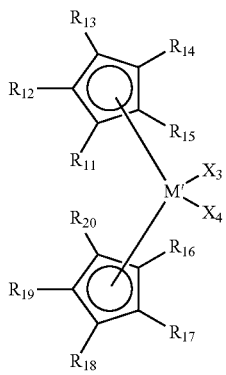

in Chemical Formula 2,

M' is Ti, Zr or Hf, $X_3$ and $X_4$ are the same as or different from each other, and are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, and $R_{11}$ to $R_{20}$ are the same as or different from each other, and are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, or one or more pairs of neighboring substituents of $R_{11}$ to $R_{20}$ may be connected with each other to form a substituted or unsubstituted aliphatic or aromatic ring.

The following terms may be defined as follows, unless the present disclosure specifically defines otherwise.

Halogen may be fluorine (F), chlorine (Cl), bromine (Br) or iodine (I).

The C1 to C20 alkyl group may be a linear, branched, or cyclic alkyl group. Specifically, the C1 to C20 alkyl group may be a C1 to C20 linear alkyl group; a C1 to C10 linear alkyl group; a C1 to C5 linear alkyl group; a C3 to C20 branched or cyclic alkyl group; a C3 to C15 branched or cyclic alkyl group; or a C3 to C10 branched or cyclic alkyl group. More specifically, the C1 to C20 alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, or the like.

The C2 to C20 heterocycloalkyl group may be a cyclic alkyl group containing at least one atom other than carbon exemplified by oxygen, nitrogen or sulfur. Specifically, the C2 to C20 heterocycloalkyl group may be a C2 to C15 heterocycloalkyl group, a C2 to C10 heterocycloalkyl group, or a C4 to C7 heterocycloalkyl group. More specifically, the C2 to C20 heterocycloalkyl group may be an epoxy group, a tetrahydrofuranyl group, a tetrahydropyranyl group, a tetrahydrothiophenyl group, a tetrahydropyrrolyl group, or the like.

The C1 to C20 alkoxy group may be a linear, branched, or cyclic alkoxy group. Specifically, the C1 to C20 alkoxy group may be a C1 to C20 linear alkoxy group; a C1 to C10 linear alkoxy group; a C1 to C5 linear alkoxy group; a C3 to C20 branched or cyclic alkoxy group; a C3 to C15 branched or cyclic alkoxy group; or a C3 to C10 branched or cyclic alkoxy group. More specifically, the C1 to C20 alkoxy group may be a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cyclohexyloxy group, or the like.

The C2 to C20 alkoxyalkyl group may be a substituent in which at least one hydrogen of the alkyl group ($-R^a$) is substituted with an alkoxy group ($-O-R^b$) with a structure including $-R^a-O-R^b$. Specifically, the C2 to C20 alkoxyalkyl group may be a methoxymethyl group, a methoxyethyl group, an ethoxymethyl group, an iso-propoxymethyl group, an iso-propoxyethyl group, an iso-propoxyheptyl group, a tert-butoxymethyl group, a tert-butoxyethyl group, tert-butoxyhexyl group or the like.

The C1 to C20 alkylsilyl group may be a substituent in which at least one hydrogen of the silyl group ($-SiH_3$) is substituted with an alkyl group or alkoxy group. Specifically, the C1 to C20 alkylsilyl group may be a methylsilyl group, a dimethylsilyl group, a trimethylsilyl group, a dimethylethylsilyl group, a diethylmethylsilyl group, a dimethylpropylsilyl group, a methoxysilyl group, a dimethoxysilyl group, a trimethoxysilyl group, a dimethoxyethoxysilyl group, a diethoxymethylsilyl group, a dimethoxypropylsilyl group, or the like.

The C1 to C20 silylalkyl group may be a substituent in which at least one hydrogen of the alkyl group is substituted with a silyl group. Specifically, the C1 to C20 silylalkyl group may be a dimethoxypropylsilylmethyl group, or the like.

The C1 to C20 silyloxyalkyl group may be a substituent in which at least one hydrogen of the alkyl group is substituted with a silyloxy group. Specifically, the C1 to C20 silyloxyalkyl group may be a dimethoxypropylsilyloxymethyl group.

The C2 to C20 alkenyl group may be a linear, branched, or cyclic alkenyl group. Specifically, the C2 to C20 alkenyl group may be a C2 to C20 linear alkenyl group, a C2 to C10 linear alkenyl group, a C2 to C5 linear alkenyl group, a C3 to C20 branched alkenyl group, a C3 to C15 branched alkenyl group, a C3 to C10 branched alkenyl group, a C5 to C20 cyclic alkenyl group, or a C5 to C10 cyclic alkenyl group. More specifically, the C2 to C20 alkenyl group may be an ethenyl group, a propenyl group, a butenyl group, a pentenyl group, a cyclohexenyl group, or the like.

The C1 to C20 carboxylate has a $-COOR^c$ structure, wherein $R^c$ may be a C1 to C20 hydrocarbyl group. The hydrocarbyl group is a monovalent functional group in which a hydrogen atom is removed from a hydrocarbon, and may include an alkyl group, an aryl group, and the like. Specifically, the C1 to C20 carboxylate may be a pivalate or the like.

The C6 to C20 aryl group may mean a monocyclic, bicyclic or tricyclic aromatic hydrocarbon. In addition, the aryl group may be used to include an aralkyl group in which at least one hydrogen of the alkyl group is substituted with an aryl group. Specifically, the C6 to C20 aryl group may be a phenyl group, a naphthyl group, an anthracenyl group, a benzyl group or the like.

The C5 to C20 heteroaryl group may be a cyclic aryl group including at least one atom other than carbon exemplified by oxygen, nitrogen and sulfur. Specifically, the C5 to C20 heteroaryl group may be a C5 to C15 heteroaryl group or a C5 to C10 heteroaryl group. More specifically, the C5 to C20 heteroaryl group may be a furanyl group, a pyranyl group, a thiophenyl group, a pyrrolyl group or the like.

The C1 to C20 sulfonate group has a —O—SO$_2$—R$^d$ structure, wherein R$^d$ may be a C1 to C20 hydrocarbyl group. Specifically, the C1 to C20 sulfonate group may be a methanesulfonate group, a phenylsulfonate group or the like.

The C1 to C20 sulfone group has a —R$^{e'}$—SO$_2$—R$^{e''}$ structure, wherein R$^{e'}$ and R$^{e''}$ are the same as or different from each other, and each may independently be a C1 to C20 hydrocarbyl group. Specifically, the C1 to C20 sulfone group may be a methylsulfonylmethyl group, a methylsulfonylpropyl group, a methylsulfonylbutyl group, a phenylsulfonylpropyl group or the like.

In addition, forming a substituted or unsubstituted aliphatic or aromatic ring by connecting one or more pairs of neighboring substituents with each other means that one or more pairs of substituents among pairs of two neighboring substituents are connected with each other to form an aliphatic or aromatic ring, and the aliphatic or aromatic ring may be substituted with any substituent. For example, a pair of neighboring substituents of R$_7$ and R$_8$ may be connected with each other to form a substituted or unsubstituted aliphatic or aromatic ring, as shown in the following Chemical Formula 1a or 1b.

The substituents described above may be optionally substituted with one or more substituents selected from the group consisting of a hydroxyl group, halogen, an alkyl group, a heterocycloalkyl group, an alkoxy group, an alkenyl group, a silyl group, a phosphine group, a phosphide group, a sulfonate group, a sulfone group, an aryl group, and a heteroaryl group, within the range that exhibits the same or similar effect as the desired effect.

The preparation method of the olefin polymer according to the embodiment of the present disclosure can easily control the content and the weight average molecular weight of the branched polymer, and the length and the molecular weight of LCB by using the supported catalyst including the first and second transition metal compounds represented by the Chemical Formulae 1 and 2 in an optimal amount.

Specifically, the supported catalyst may exhibit excellent catalytic activity by including a cyclopentadienyl ligand and an asymmetric ligand of an indenyl ligand in the first transition metal compound of Chemical Formula 1.

In addition, the substituents of the ligand may affect the polymerization activity of the olefinic monomers and the physical properties of the olefin polymer.

Specifically, R$_1$ to R$_4$ of the cyclopentadienyl ligand may each independently be selected from the group consisting of hydrogen, a C1 to C10 alkyl group, a C1 to C10 alkoxy group and a C2 to C10 alkenyl group. More specifically, R$_1$ to R$_4$ may each independently be selected from the group consisting of a methyl group, an ethyl group, a propyl group, and a butyl group. In this case, the supported catalyst can exhibit very high activity in the olefinic monomers polymerization process and can provide an olefin polymer with desired properties.

In addition, R of the indenyl ligand may be selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and R$_5$ to R$_9$ may each independently be selected from the group consisting of hydrogen, a C1 to C10 alkyl group, a C1 to C10 alkoxy group and a C2 to C10 alkenyl group.

More specifically, R may be selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and R$_5$ to R$_9$ may be hydrogen. By having a substituent only at the position of R, it is possible to exhibit very high activity in the olefinic monomers polymerization process and to provide an olefin polymer with desired properties. More specifically, R may be a C1 to C10 alkyl group, and further more specifically may be selected from the group consisting of a methyl group, an ethyl group, a propyl group and a butyl group.

In addition, the two ligands may be crosslinked by -T(Q$_1$)(Q$_2$)- to exhibit excellent stability. In order to effectively ensure this effect, Q$_1$ and Q$_2$ may each independently be a C1 to C10 alkyl group. More specifically, Q$_1$ and Q$_2$ may be the same, and selected from the group consisting of a methyl group, an ethyl group, a propyl group and a butyl group. In addition, T may be C, Si, Ge, Sn or Pb; or C or Si; or Si.

In addition, there exists M(X$_1$)(X$_2$) between the two ligands which are crosslinked, and M(X$_1$) (X$_2$) may affect the storage stability of the metal complex. In order to effectively ensure this effect, transition metal compounds wherein X$_1$ and X$_2$ are each independently selected from the group consisting of halogen, a C1 to C20 alkyl group and a C1 to C20 alkoxy group may be used. More specifically, X$_1$ and X$_2$ may each independently be F, Cl, Br or I. In addition, M may be Ti, Zr or Hf; or Zr or Hf; or Zr.

As an example, the first transition metal compound capable of providing an olefin polymer having improved processability may be exemplified by a compound represented by the following Chemical Formula 1a:

[Chemical Formula 1a]

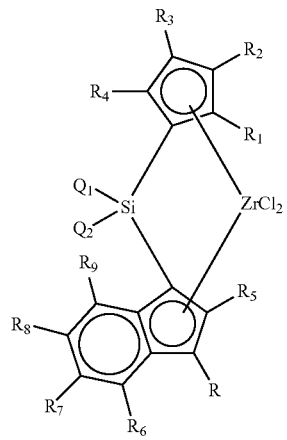

in Chemical Formula 1a,

Q$_1$ and Q$_2$ are the same as or different from each other, and are each independently selected from the group consisting of a C1 to C10 alkyl group, a C1 to C10 alkoxy group, and a C2 to C10 alkoxyalkyl group, and more specifically a C1 to C10 alkyl group, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and more specifically a C1 to C10 alkyl group, $R_1$ to $R_4$ are the same as or different from each other, and are each independently hydrogen or a C1 to C10 alkyl group, and $R_5$ to $R_9$ are hydrogen.

As an example, the first transition metal compound capable of providing an olefin polymer having improved processability may be exemplified by a compound (1a-1) represented by the following structural formula:

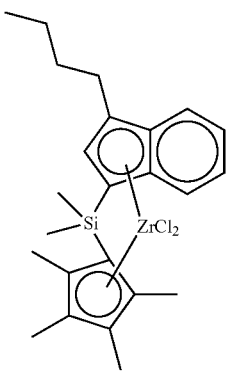

(1a-1)

In the supported catalyst, the second transition metal compound represented by the Chemical Formula 2 is a non-crosslinked transition metal compound, and the two ligands may affect, for example, the polymerization activity of the olefinic monomers.

$R_{11}$ to $R_{20}$ of the two ligands may each independently be selected from the group consisting of hydrogen, a C1 to C20 alkyl group, a C1 to C20 alkoxy group, and a C2 to C20 alkenyl group, or one or more pairs of neighboring substituents of $R_{11}$ to $R_{20}$ may be connected with each other to form a substituted or unsubstituted aliphatic ring. More specifically, $R_{11}$ to $R_{20}$ may each independently be selected from the group consisting of hydrogen, a C1 to C6 alkyl group, a C1 to C6 alkoxy group, and a C2 to C6 alkenyl group, or one or more pairs of neighboring substituents of $R_{11}$ to $R_{20}$ may be connected with each other to form a substituted or unsubstituted aliphatic ring. In this case, the supported catalyst can exhibit very high activity in the polymerization process of the olefinic monomers.

In addition, there exists $M'(X_3)(X_4)$ between the two ligands, and $M'(X_3)(X_4)$ may affect the storage stability of the metal complex.

In order to effectively ensure this effect, transition metal compounds wherein $X_3$ and $X_4$ are each independently selected from the group consisting of halogen, a C1 to C20 alkyl group and a C1 to C20 alkoxy group may be used. More specifically, $X_3$ and $X_4$ may each independently be F, Cl, Br or I. In addition, M' may be Ti, Zr or Hf; or Zr or Hf; or Zr.

As an example, the non-crosslinked second transition metal compound capable of providing an olefin polymer having improved processability may be exemplified by compounds represented by the following Chemical Formulae 2a and 2b:

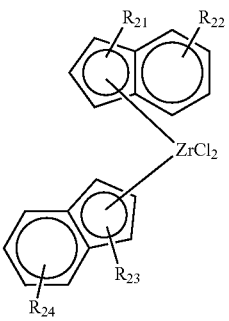

[Chemical Formula 2a]

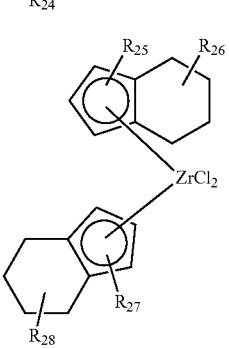

[Chemical Formula 2b]

in Chemical Formulae 2a and 2b, $R_{21}$ to $R_{28}$ are the same as or different from each other, and are each independently selected from the group consisting of halogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 alkoxysilyl group, a C1 to C20 silyloxyalkyl group, a C2 to C20 alkenyl group, a C6 to C20 aryl group, a C7 to C20 alkylaryl group, and a C7 to C20 arylalkyl group. More specifically, $R_{21}$ to $R_{28}$ may each independently be selected from the group consisting of hydrogen, a C1 to C6 alkyl group, a C1 to C6 alkoxy group, a C2 to C6 alkenyl group, and a C6 to C10 aryl group. By using the non-crosslinked transition metal compound having the above-mentioned structure, it is possible to produce a supported catalyst more stably.

As an example, the second transition metal compound capable of providing an olefin polymer having improved processability may be the compound represented by the Chemical Formula 2a. More specifically, it may be exemplified by a compound (2a-1) represented by the following structural formula:

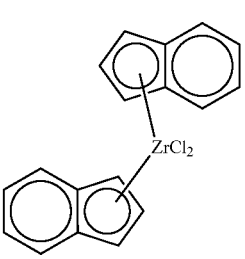

(2a-1)

The first and second transition metal compounds may be synthesized by applying known reactions, and a more detailed synthesis method can be referred to Examples.

The supported catalyst including the first and second transition metal compounds may further include a cocatalyst to activate the transition metal compounds.

As the cocatalyst, those conventionally used in the art may be applied without particular limitation. For example, the cocatalyst may be one or more compounds selected from the group consisting of the compounds represented by the following Chemical Formulae 3 to 5.

$$R_{31}-[Al(R_{32})-O]_n-R_{33} \quad \text{[Chemical Formula 3]}$$

in Chemical Formula 3, $R_{31}$, $R_{32}$ and $R_{33}$ are each independently selected from the group consisting of hydrogen, halogen, a C1 to C20 hydrocarbyl group, and a halogen-substituted C1 to C20 hydrocarbyl group, and n is an integer of 2 or more, $$D(R_{34})_3 \quad \text{[Chemical Formula 4]}$$

in Chemical Formula 4,

D is aluminum or boron, and $R_{34}$ are each independently selected from the group consisting of halogen, a C1 to C20 hydrocarbyl group, and a halogen-substituted C1 to C20 hydrocarbyl group, $$[L-H]^+[Z(A)_4]^- \text{ or } [L]^+[Z(A)_4]^- \quad \text{[Chemical Formula 5]}$$

in Chemical Formula 5,

L is a neutral or cationic Lewis base,

H is a hydrogen atom,

Z is a Group 13 element, and

A are each independently selected from the group consisting of a C1 to C20 hydrocarbyl group; a C1 to C20 hydrocarbyloxy group; and substituents in which at least one hydrogen atom of these substituents is substituted with at least one substituent selected from the group consisting of halogen, a C1 to C20 hydrocarbyloxy group and a C1 to C20 hydrocarbylsilyl group.

Examples of the compound represented by Chemical Formula 3 may include methylaluminoxane, ethylaluminoxane, isobutylaluminoxane, tert-butylaluminoxane, or the like. In addition, examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-sec-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, or the like. Lastly, examples of the compound represented by Chemical Formula 5 may include trimethylammonium tetrakis(pentafluorophenyl)borate, triethylammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl) borate, N,N-dimethylanilinium tetrakis(4-(triisopropylsilyl)-2,3,5,6-tetrafluorophenyl)borate, N,N-dimethyl-2,4,6-trimethylanilinium tetrakis(pentafluorophenyl)borate, trimethylammonium tetrakis(2,3,4,6-tetrafluorophenyl)borate, N,N-dimethylanilinium tetrakis(2,3,4,6-tetrafluorophenyl) borate, hexadecyldimethylammonium tetrakis(pentafluorophenyl)borate, N-methyl-N-dodecylanilinium tetrakis(pentafluorophenyl)borate, methyldi(dodecyl)ammonium tetrakis(pentafluorophenyl)borate, or the like.

The cocatalyst may be used in an appropriate amount so that the transition metal compound can be sufficiently activated.

In addition, the supported catalyst may have silica, alumina, magnesia, or the mixture thereof as the support. Or, these materials may be used in the state that highly reactive hydroxyl groups or siloxane groups are contained on the surface by drying at a high temperature to remove water over the surface. In addition, the support dried at a high temperature may include an oxide, a carbonate, a sulfate, or a nitrate, such as $Na_2O$, $K_2CO_3$, $BaSO_4$, $Mg(NO_3)_2$, and the like.

The drying temperature is preferably 200 to 800° C., more preferably 300 to 600° C., and most preferably 300 to 400° C. If the drying temperature of the support is less than 200° C., the moisture is too much, so that the moisture can react with the cocatalyst. If the temperature exceeds 800° C., the pores on the surface of the support are combined to reduce the surface area, and the hydroxyl groups on the surface are largely removed, thereby only the siloxane groups are remained, which reduces the reaction site with the cocatalyst.

In addition, the amount of the hydroxyl group on the surface of the support is preferably 0.1 to 10 mmol/g, and more preferably 0.5 to 1 mmol/g. The amount of hydroxyl group on the surface of support can be controlled depending on the preparation method of the support and its conditions, or drying conditions such as temperature, time, vacuum, and spray drying.

Further, in the preparation method according to the embodiment of the present disclosure, the supported catalyst including the transition metal compounds and the support may have a bulk density of 0.40 to 0.10 g/ml, more specifically 0.40 to 0.50 g/mol. By having such a high bulk density, more excellent catalytic activity can be exhibited.

In addition, the supported catalyst may be prepared, for example, by supporting a cocatalyst on a support; and supporting a first and second transition metal compounds on the cocatalyst-supported support one by one, regardless of the order, or simultaneously.

Specifically, in the step of supporting a cocatalyst on a support, the support and the cocatalyst may be mixed, and then stirred at a temperature of about 20 to 120° C. to prepare a cocatalyst-supported support.

In addition, in the step of supporting a first and second transition metal compounds on the cocatalyst-supported support, the first and second transition metal compounds may be added to the cocatalyst-supported support. And, the resulting solution may be stirred at a temperature of about 20 to 120° C. If only one kind of transition metal compound is added in advance, the remaining one kind of transition metal compound may be added, and then the resulting solution may be stirred at a temperature of about 20 to 120° C. to prepare a supported catalyst.

The content of the support, cocatalyst, cocatalyst-supported support and transition metal compound used for using the supported catalyst may be appropriately controlled depending on the physical properties or effects of the desired supported catalyst.

Specifically, the first and second transition metal compounds may be included in a weight ratio of 1:0.1 to 1:1. When the transition metal compound of the Chemical Formula 1 exceeds the above range, the content of the branched polymer structure and the content of LCB are excessively increased, which may lower the melt strength, followed by deterioration of the processability and the mechanical properties of the produced film. When the amount is less than the above range, the mechanical properties of the film to be produced may be deteriorated. The first and second transition metal compounds may be included in a weight ratio of 5:1 to 2:1, considering the excellence of the improvement effect of controlling the mixing weight ratio of the first and second transition metal compounds. In this case, a remarkably improved effect can be obtained in terms of mechanical properties and processability.

In addition, the weight ratio of the total transition metal compound including the first and second transition metal compounds to the support may be 1:10 to 1:1,000, more specifically 1:10 to 1:500. When the support and the transition metal compound are included within the range, an optimal shape can be obtained.

When the supported catalyst further includes a cocatalyst, the weight ratio of the cocatalyst to the support may be 1:1 to 1:100, more specifically 1:1 to 1:50. When the cocatalyst and the support are included within the range, the activity and the polymer microstructure can be optimized.

As a reaction solvent in the preparation of the supported catalyst, for example, an aliphatic hydrocarbon solvent such as pentane, hexane, heptane, nonane, decane and isomers thereof; an aromatic hydrocarbon solvent such as toluene, xylene and benzene; or a hydrocarbon solvent substituted with a chlorine atom such as dichloromethane and chlorobenzene may be used. In addition, since the supported catalyst reacts sensitively with moisture or oxygen, it may be prepared in an inert atmosphere such as nitrogen or argon.

As the specific preparation method of the supported catalyst, the following Preparation Examples can be referred to. However, the preparation method of the supported catalyst is not limited to this description. The preparation method may further include a step which is usually carried out in the technical field of the present invention, and the step(s) of the preparation method may be changed by the step(s) usually changeable.

Meanwhile, in the preparation method of the olefin polymer according to the embodiment of the present disclosure, for example, ethylene and an alpha-olefin may be used as the olefinic monomers. Specific example of the alpha-olefin includes propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof. Among them, the olefin polymer satisfying the above-mentioned properties can be easily prepared by using ethylene and 1-hexene as the olefinic monomers.

In the preparation method according to the embodiment of the present disclosure, various polymerization processes known as the polymerization of olefinic monomers such as a continuous solution polymerization process, a bulk polymerization process, a suspension polymerization process, a slurry polymerization process or an emulsion polymerization process may be applied for the polymerization reaction of the olefinic monomers.

For example, the polymerization reaction may be carried out by continuously introducing hydrogen in the presence of the above-mentioned supported catalyst and continuously polymerizing the ethylene and alpha-olefin monomer.

Such a polymerization reaction may be carried out at a temperature of about 50° C. to 110° C. or about 60° C. to 100° C., and a pressure of about 1 bar to 100 bar or about 10 bar to 80 bar, and the hydrogen is used in an amount of 3 to 10 ppm, more specifically 5 to 7 ppm. When the polymerization reaction is carried out under the above-mentioned conditions, the olefin polymer to be produced can obtain the physical properties of the present disclosure.

In the polymerization reaction, the supported catalyst may be used in the state of being dissolved or diluted in a solvent such as pentane, hexane, heptane, nonane, decane, toluene, benzene, dichloromethane, chlorobenzene and the like. In this case, by treating the solvent with a small amount of alkylaluminum or the like, a small amount of water or air which can adversely affect the catalyst can be removed in advance.

By the above-mentioned preparation method, the olefin polymer according to the embodiment of the present disclosure having the above-mentioned physical properties can be produced.

The olefin polymer according to one embodiment of the present disclosure having the above-mentioned physical properties has excellent foam stability and processing load characteristics, thereby exhibiting excellent processability in producing a film, and having excellent mechanical properties. Accordingly, it can be applied to various fields requiring excellent mechanical properties and processability. In particular, since the olefin polymer has a high melt strength, a blown film can be stably formed by a melt blown process. In addition, a film, particularly a blown film, having TD and MD tensile strengths measured according to ISO D882 of 450 MPa or more, and a drop impact strength measured according to ASTM D1709 of 550 MPa or more can be provided due to the effect of improving the mechanical properties of the olefin polymer.

Hereinafter, the function and effect of the present invention will be described in more detail through specific examples of the present invention. However, these examples are for illustrative purposes only, and the invention is not intended to be limited by these examples.

Synthesis Example 1: Synthesis of Transition Metal Compound (Metallocene Catalyst Precursor A)

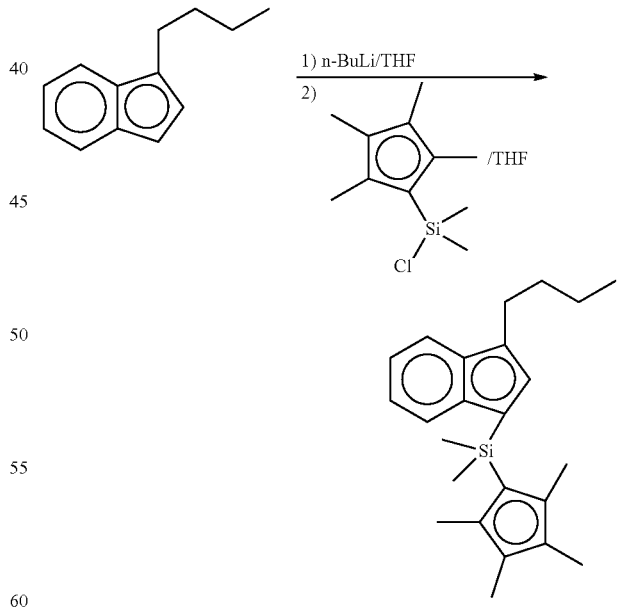

Tetramethylcyclopentadiene (TMCP, 6.0 mL, 40 mmol) was dissolved in THF (60 mL) in a dried 250 mL Schlenk flask and then cooled to −78° C. Then n-BuLi (2.5 M, 17 mL, 42 mmol) was slowly added dropwise to the above solution, and the mixture was stirred overnight at room temperature.

On the other hand, dichlorodimethylsilane (4.8 mL, 40 mmol) was dissolved in n-hexane in another 250 mL Schlenk flask and then cooled to −78° C. Then, the TMCP-lithiation solution previously prepared was slowly added to this solution, and the mixture was stirred overnight at room temperature. Thereafter, the resulting solution was subjected to reduced pressure to remove solvent. The resulting solid was dissolved in toluene and filtered to remove residual LiCl, thereby obtaining chlorodimethyl(2,3,4,5-tetramethyl-cyclopenta-2,4-dien-1-yl) silane as an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

3-butyl-1H-indene (560 mg, 3.3 mmol) was dissolved in THF (20 mL) in a dried 100 mL Schlenk flask and then cooled to −78° C. Then n-BuLi (2.5 M, 1.4 mL, 3.4 mmol) was slowly added dropwise to the above solution, and the mixture was stirred at room temperature for about 2.5 hours. On the other hand, the intermediate (700 mg, 3.3 mmol) previously synthesized was dissolved in THF in another 100 mL Schlenk flask and then cooled to −78° C. Then, the indene-lithiation solution previously prepared was slowly added to this solution, and the mixture was stirred overnight at room temperature to obtain a purple solution. Thereafter, water was poured into the reactor to quench the reaction, and the organic layer was extracted with ether from the mixture to separate and obtain a ligand in the form of a yellow liquid (1.1 g, 3.2 mmol, 98% yield).

$^1$H NMR (500 MHz, CDCl$_3$): −0.45 (3H, s), −0.15 (3H, s), 0.97 (3 h, t). 1.45 (2H, m), 1.67 (2H, m), 1.86 (6H, s), 2.01 (6H, d), 2.60 (2H, t), 3.04 (1H, s), 3.50 (1H, s), 6.19 (1H, s), 7.15-7.18 (1H, m), 7.24-7.26 (1H, m), 7.40 (2H, d).

The ligand (1.1 g, 3.2 mmol) previously synthesized was dissolved in THF (30 mL) in a dried 100 mL Schlenk flask, and cooled to −78° C. n-BuLi (2.5 M, 2.6 mL, 6.4 mmol) was slowly added dropwise to the above solution, and then stirred overnight at room temperature. Meanwhile, ZrCl$_4$ (THF)$_2$ (1.2 g, 3.2 mmol) was dispersed in toluen (30 mL) in another 100 mL Schlenk flask, and cooled to −78° C. Subsequently, the lithiated ligand solution previously prepared was slowly added to the above mixture. After the obtained mixture was stirred at room temperature for 4 hours, the solvent was removed under reduced pressure, and precipitated with n-hexane and filtered. As a result, the reaction product was present in both filter cake and filtrate (1.1 g, 2.1 mmol, 65% yield). The filter cake, which was a mixture with LiCl, was extracted with toluene to separate the reaction product (650 mg, 1.3 mmol, 40% yield).

$^1$H NMR (500 MHz, CDCl$_3$): 0.93 (3H, t), 1.16 (3H, s), 1.37-1.41 (2H, m), 1.57-1.77 (2H, m), 1.89 (3H, s), 1.93 (6H, d), 2.00 (3H, s), 2.82-3.00 (2H, m), 5.56 (1H, s), 7.04 (1H, t), 7.32 (1H, t), 7.46 (1H, d), 7.57 (1H, d).

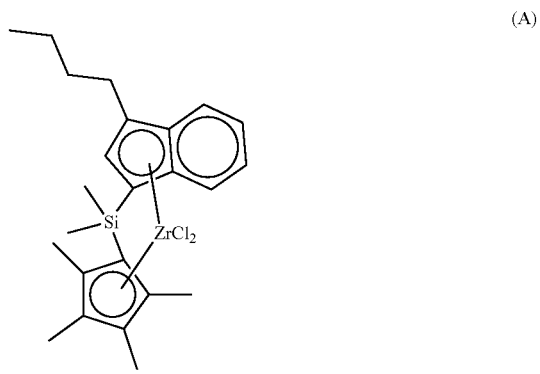

(A)

Synthesis Example 2: Synthesis of Transition Metal Compound (Metallocene Catalyst Precursor B)

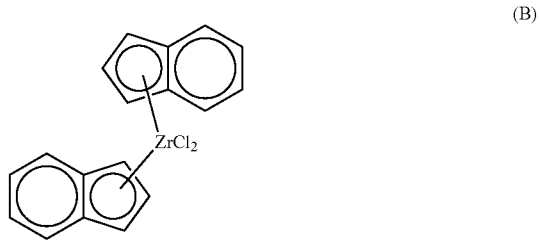

(B)

The metallocene compound (B) having the above structural formula was prepared (purchased from Strem Corporation, Cas Number 12148-49-1).

Synthesis Example 3: Synthesis of Transition Metal Compound (Metallocene Catalyst Precursor C)

Tetramethylcyclopentadiene (TMCP, 6.0 mL, 40 mmol) was dissolved in THF (60 mL) in a dried 250 mL Schlenk flask and then cooled to −78° C. Then n-BuLi (2.5 M, 17 mL, 42 mmol) was slowly added dropwise to the above solution, and the mixture was stirred overnight at room temperature.

On the other hand, dichlorodimethylsilane (4.8 mL, 40 mmol) was dissolved in n-hexane in another 250 mL Schlenk flask and then cooled to −78° C. Then, the TMCP-lithiation solution previously prepared was slowly added to this solution, and the mixture was stirred overnight at room temperature.

Thereafter, the resulting solution was subjected to reduced pressure to remove solvent. The resulting solid was dissolved in toluene and filtered to remove residual LiCl, thereby obtaining an intermediate (yellow liquid, 7.0 g, 33 mmol, 83% yield).

$^1$H NMR (500 MHz, CDCl$_3$): 0.24 (6H, s), 1.82 (6H, s), 1.98 (6H, s), 3.08 (1H, s).

Indene (0.93 mL, 8.0 mmol) was dissolved in THF (30 mL) in a dried 250 mL Schlenk flask and then cooled to −78° C. Then n-BuLi (2.5 M, 3.4 mL, 8.4 mmol) was slowly added dropwise to the above solution, and the mixture was stirred at room temperature for about 5 hours.

On the other hand, the intermediate (1.7 g, 8.0 mmol) previously synthesized was dissolved in THF in another 250 mL Schlenk flask and then cooled to −78° C. Then, the indene-lithiation solution previously prepared was slowly added to this solution, and the mixture was stirred overnight at room temperature to obtain a purple solution.

Thereafter, water was poured into the reactor to quench the reaction, and the organic layer was extracted with ether from the mixture. It was confirmed by $^1$H NMR that dimethyl(indenyl)(tetramethylcyclopentadienyl) silane and another kind of organic compound were contained in the organic layer. The organic layer was concentrated without purification and used directly for metallation.

Dimethyl(indenyl)(tetramethylcyclopentadienyl) silane (1.7 g, 5.7 mmol) previously synthesized was dissolved in toluene (30 mL) and MTBE (3.0 mL) in a 250 mL Schlenk flask. After cooling to −78° C., n-BuLi (2.5 M, 4.8 mL, 12 mmol) was slowly added dropwise to the above solution, and then stirred overnight at room temperature. However, a yellow solid was formed in the above solution and not stirred uniformly, and thus MTBE (50 mL) and THF (38 mL) were further added thereto.

On the other hand, ZrCl$_4$(THF)$_2$ was dispersed in toluene in another 250 mL Schlenk flask and then cooled to −78° C. Subsequently, the lithiated ligand solution previously prepared was slowly added to the above mixture and stirred overnight.

The reaction product was then filtered to obtain dimethylsilylene (tetramethylcyclopentadienyl)(indenyl) zirconium dichloride in the form of a yellow solid (1.3 g, including 0.48 g of LiCl, 1.8 mmol). The solvent was removed from the filtrate and washed with n-hexane to give a yellow solid (320 mg, 0.70 mmol) (total 44% yield).

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d).

The dimethylsilylene(tetramethylcyclopentadienyl)(indenyl) zirconium dichloride previously synthesized (1.049 g, 2.3 mmol) was put into a mini bombe in a glove box. Then, platinum oxide (52.4 mg, 0.231 mmol) was further put into the mini bombe. After the mini bombe was assembled, anhydrous THF (30 mL) was added using cannula to the mini bombe, and filled with hydrogen up to pressure of about 30 bar. Subsequently, the mixture put in the mini bombe was stirred at about 60° C. for about 1 day, then the temperature of the mini bombe was cooled to room temperature, and hydrogen was replaced with argon while gradually lowering the pressure of the mini bombe.

On the other hand, celite dried in an oven at about 120° C. for about 2 hours was laid on a schlenk filter, and the reaction product of the mini bombe was filtered under argon. The PtO$_2$ catalyst was removed from the reaction product through celite. Subsequently, the catalyst-removed reaction product was subjected to reduced pressure to remove the solvent, thereby obtaining dimethylsilylene(tetramethylcyclopentadienyl)(tetrahydroindenyl) zirconium dichloride (hereinafter referred to as 'metallocene catalyst precursor C') in the form of a pale yellow solid (0.601 g, 1.31 mmol, Mw: 458.65 g/mol).

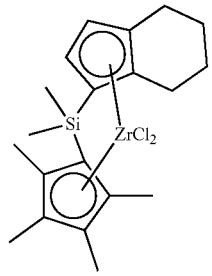

(C)

$^1$H NMR (500 MHz, CDCl$_3$): 0.82 (3H, s), 0.88 (3H, s), 1.92 (6H, s), 1.99 (3H, s), 2.05 (3H, s), 2.34 (2H, m), 2.54 (2H, m), 2.68 (2H, m), 3.03 (2H, m), 5.45 (1H, s), 6.67 (1H, s).

Synthesis Example 4: Synthesis of Transition Metal Compound (Metallocene Catalyst Precursor D)

TMCP-Li (1.3 g, 10 mmol), CuCN (45 mg, 5 mol %) and THF (10 mL) were added to a 250 mL Schlenk flask. Dichlorodiphenylsilane (2.5 g, 10 mmol) was added dropwise at −20° C. or lower, and the mixture was stirred at room temperature for 16 hours.

The temperature of the flask was lowered to −20° C. or lower, and then indene-lithiation solution (1.2 g, 10 mmol in 10 mL of THF) was added dropwise. The mixture was stirred at room temperature for 24 hours.

Subsequently, the resulting solution was dried under reduced pressure to remove the solvent. Thereafter, filtration with hexane was carried out to remove residual LiCl, and filtrate was dried under vacuum to remove hexane and obtain diphenyl(indenyl)(tetramethylcyclopentadienyl) silane.

Diphenyl(indenyl)(tetramethylcyclopentadienyl) silane (4.2 g, 10 mmol) prepared above and THF (15 mL) were added to a 100 mL Schlenk flask and then the temperature was lowered to −20° C. or lower. n-BuLi (2.5 M in Hexane, 8.4 mL, 21 mmol) was slowly added dropwise, and the mixture was stirred at room temperature for 6 hours.

Meanwhile, ZrCl$_4$(THF)$_2$ (3.8 g, 10 mmol) was dispersed in toluene (15 mL) in another 250 mL Schlenk flask and the mixture was stirred at −20° C. The lithiated ligand solution was slowly added thereto. The reaction mixture was stirred at room temperature for 48 hours.

Subsequently, the resulting solution was dried under vacuum to remove the solvent. The resulting solid was dissolved in dichloromethane (DCM) and filtered to remove LiCl, and DCM was removed by drying under vacuum. 30 mL of toluene was added thereto and the mixture was stirred for 16 hours and then filtered to obtain diphenylsilylene (tetramethylcyclopentadienyl)(indenyl) zirconium dichloride (2.1 g, 3.6 mmol, 36% yield) in the form of a lemon colored solid.

$^1$H NMR (500 MHz, CDCl$_3$): 8.08-8.12 (2H, m), 7.98-8.05 (2H, m), 7.77 (1H, d), 7.47-7.53 (3H, m), 7.42-7.46 (3H, m), 7.37-7.41 (2H, m), 6.94 (1H, t), 6.23 (1H, d), 1.98 (3H, s), 1.95 (3H, s), 1.68 (3H, s), 1.52 (3H, s).

Diphenylsilylene(tetramethylcyclopentadienyl)(indenyl) zirconium dichloride (1.0 g, 1.7 mmol) prepared above, Pd/C (10 mol %) and DCM (40 mL) were injected into a 100 mL high pressure reactor and filled with hydrogen up to pressure of about 60 bar. Subsequently, the mixture in the high pressure reactor was stirred at about 80° C. for 24 hours. Upon completion of the reaction, the reaction product was passed through a celite pad to remove the solid, and diphenylsilylene(tetramethylcyclopentadienyl)(tetrahydroindenyl) zirconium dichloride (hereinafter referred to as 'metallocene catalyst precursor D') was obtained (0.65 g, 1.1 mmol, yield 65%).

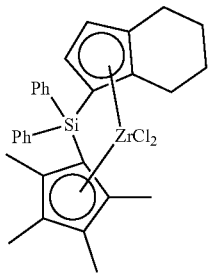

(D)

$^1$H NMR (500 MHz, CDCl$_3$): 7.90-8.00 (4H, m), 7.38-7.45 (6H, m), 6.80 (1H, s), 5.71 (1H, s), 3.15-3.50 (1H, m), 2.75-2.85 (1H, m), 2.50-2.60 (1H, m), 2.12 (3H, s), 2.03 (3H, s), 1.97-2.07 (1H, m), 1.76 (3H, s), 1.53-1.70 (4H, m), 1.48 (3H, s).

Synthesis Example 5: Synthesis of Transition Metal Compound (Metallocene Catalyst Precursor E)

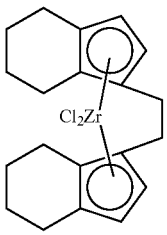

(E)

The metallocene compound, dichloro [rac-ethylenebis(4,5,6,7-tertahydro-1-indenyl)]zirconium(IV), having the above structural formula was prepared (purchased from Sigma-Aldrich Corporation, Cas Number 100163-29-9).

Synthesis Example 6: Synthesis of Transition Metal Compound (Metallocene Catalyst Precursor F)

Tetramethylcyclopentadiene (TMCP, 6.0 mL, 40 mmol) was dissolved in THF (60 mL) in a dried 250 mL Schlenk flask and then cooled to −78° C. Then n-BuLi (2.5 M in THF, 17 mL, 42 mmol) was slowly added dropwise to the above solution, and the mixture was stirred overnight at room temperature.

On the other hand, dichlorodimethylsilane (4.8 mL, 40 mmol) was dissolved in n-hexane in another 250 mL Schlenk flask and then cooled to −78° C.

Then, the TMCP-lithiation solution previously prepared was slowly added to this solution, and the mixture was stirred overnight at room temperature.

Thereafter, the resulting solution was subjected to reduced pressure to remove solvent. The resulting solid was dissolved in toluene and filtered to remove residual LiCl, thereby obtaining an intermediate in the form of a yellow liquid (F1, 7.0 g, 33 mmol, 83% yield).

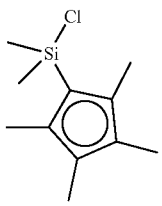

(F1)

$^1$H NMR (500 MHz, CDCl$_3$): 0.24 (6H, s), 1.82 (6H, s), 1.98 (6H, s), 3.08 (1H, s)

Indene (0.93 mL, 8.0 mmol) was dissolved in THF (30 mL) in a dried 250 mL Schlenk flask and then cooled to −78° C. Then n-BuLi (2.5 M in THF, 34 mL, 8.4 mmol) was slowly added dropwise to the flask, and the mixture was stirred at room temperature for about 5 hours to obtain an indene-lithiation solution.

On the other hand, the intermediate (F1, 1.7 g, 8.0 mmol) previously synthesized was dissolved in THF in another 250 mL Schlenk flask and then cooled to −78° C.

Then, the indene-lithiation solution previously prepared was slowly added to the above solution including the intermediate, and the mixture was stirred overnight at room temperature to obtain a purple solution. Water was poured to the purple solution to quench the reaction. Thereafter, the organic layer was extracted with ether from the purple solution. And, the organic layer was subjected to reduced pressure to obtain 1.7 g of mixture containing the following ligand compound (F2) in the form of a yellow liquid.

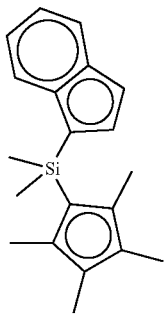

(F2)

1.7 g (5.7 mmol) of the mixture containing the ligand compound (F2) was dissolved in THF (30 mL) and MTBE (methyl t-butyl ether, 3.0 mL) in a 250 mL Schlenk flask. After cooling to −78° C., n-BuLi (2.5 M, 4.8 mL, 12 mmol) was added to the above solution, and then stirred overnight at room temperature. After the stirring was completed, MTBE (50 mL) and THF (38 mL) were added thereto to obtain a yellow solution.

On the other hand, ZrCl$_4$(THF)$_2$ was dispersed in THF in another 250 mL Schlenk flask and then cooled to −78° C. Subsequently, the yellow solution previously prepared was slowly added thereto, and stirred overnight. Thereafter, the reaction product was then filtered to obtain the compound having the following structural formula (F) in the form of a yellow solid (44% yield).

(F)

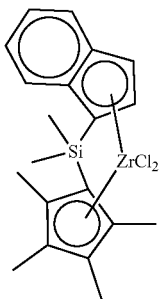

$^1$H NMR (500 MHz, CDCl$_3$): 0.96 (3H, s), 1.16 (3H, s), 1.91 (3H, s), 1.93 (3H, s), 1.96 (3H, s), 1.97 (3H, s), 5.98 (1H, d), 7.07 (1H, t), 7.23 (1H, d), 7.35 (1H, t), 7.49 (1H, d), 7.70 (1H, d)

Preparation Example 1: Preparation of Supported Catalyst 4.0 kg of toluene and 1000 g of silica (Grace Davison, SP2410) were added to a 10 L high pressure reactor, and the mixture was stirred while raising the temperature of the reactor to 40° C. 2.1 kg of 30 wt % methylaluminoxane (MAO)/toluene solution (Albemarle Corporation) was added thereto, the temperature was raised to 70° C., and then the mixture was stirred at about 200 rpm for about 12 hours.

Meanwhile, the metallocene catalyst precursor A (45 g), the metallocene catalyst precursor B (10.2 g), toluene (1 L) and triisobutylaluminum (30 g) were added to a 2 L Schlenk flask and stirred at room temperature (20±5° C.) for 60 minutes. The mixture was added to a high pressure reactor, the temperature was raised to 70° C., and then stirred for 2 hours. Thereafter, the temperature of the reactor was lowered to room temperature, stirring was stopped, and the reaction product was allowed to stand for 30 minutes and then decanted. Hexane (3.0 kg) was added to the reactor to obtain slurry and the slurry was transferred to a filter dryer to be filtered. After purging with argon (1.5 bar) for 10 minutes, the obtained reaction product was dried under vacuum at 40° C. for 3 hours to prepare a supported catalyst.

Preparation Examples 2 to 10: Preparation of Supported Catalyst

Supported catalysts were prepared in the same manner as in Preparation Example 1, except that the precursors were used in the amounts shown in Table 1 below.

TABLE 1

|  | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Prep. Ex. 9 | Prep. Ex. 10 |
|---|---|---|---|---|---|---|---|---|---|---|
| Composition of metallocene catalyst precursor | A/B | A/B | C alone | A alone | A/B | C/E | A/E | D/E | D alone | F/B |
| Amount (g) | 45/ 10.2 | 40/ 15.3 | 50 | 55 | 50/ 4.8 | 40/ 9.6 | 45/ 8.9 | 35/ 10.3 | 50 | 42/ 10.0 |

Examples 1, 2 and Comparative Examples 1 to 8: Preparation of Olefin Polymer

A 140 L continuous polymerization reactor capable of isobutane slurry loop process was used as the polymerization reactor. The continuous polymerization reactor was operated at reaction flow rate of about 7 m/s. The ethylene and hydrogen gas required for polymerization and 1-hexene, which is a comonomer, were constantly and continuously added in the amounts shown in Table 2 below. The concentration of all gas streams and comonomer were confirmed by an on-line gas chromatography. The supported catalyst was added after making the supported catalyst shown in the following Table 2 to isobutane slurry having the concentration shown in Table 2. The reactor pressure was maintained at 40 bar.

TABLE 2

|  | Example | | Comparative Example | | | | | | | 8 |
|---|---|---|---|---|---|---|---|---|---|---|
|  | 1 | 2 | 1 | 2 | 3 | 4 | 5 | 6 | 7 | |
| Catalyst | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Prep. Ex. 9 | Prep. Ex. 10 |
| Composition of metallocene catalyst precursor | A/B | A/B | C alone | A alone | A/B | C/E | A/E | D/E | D | F/B alone |

TABLE 2-continued

|  | Example | | Comparative Example | | | | | | | |
|---|---|---|---|---|---|---|---|---|---|---|
|  | 1 | 2 | 1 | 2 | 3 | 4 | 5 | 6 | 7 | 8 |
| Catalyst | Prep. Ex. 1 | Prep. Ex. 2 | Prep. Ex. 3 | Prep. Ex. 4 | Prep. Ex. 5 | Prep. Ex. 6 | Prep. Ex. 7 | Prep. Ex. 8 | Prep. Ex. 9 | Prep. Ex. 10 |
| Polymerization temp. (° C.) | 87 | 87 | 85 | 85 | 85 | 86 | 85 | 86 | 85 | 86 |
| Amount of ethylene (kg/hr) | 28 | 28 | 28 | 25 | 26 | 26 | 28 | 25 | 27 | 27 |
| Amount of hydrogen (ppm) | 6.0 | 5.0 | 8.0 | 7.5 | 7.0 | 6.5 | 5.5 | 4.0 | 6.0 | 4.0 |
| Amount of 1-hexene $^a$ | 10.0 | 12.0 | 7.5 | 7.0 | 10.0 | 8.0 | 8.0 | 6.5 | 7.0 | 7.0 |
| slurry density $^b$ (g/L) | 560 | 565 | 555 | 550 | 550 | 555 | 560 | 550 | 555 | 555 |
| Activity of catalyst (kg-PE/kg-SiO$_2$/hr) | 6.5 | 5.8 | 4.0 | 4.5 | 5.0 | 5.0 | 5.0 | 4.5 | 4.0 | 4.9 |
| Bulk density (g/ml) | 0.41 | 0.39 | 0.44 | 0.40 | 0.39 | 0.42 | 0.39 | 0.43 | 0.42 | 0.43 |
| Settling efficiency (%) | 52 | 52 | 54 | 51 | 52 | 53 | 52 | 51 | 52 | 51 |

In Table 2, a Amount of 1-hexene is in wt % based on the total weight of ethylene fed to the continuous polymerization reactor.

b Slurry density is a density of the polymer present in the continuous polymerization reactor, and is a value measured using a density indicator installed in the continuous polymerization reactor.

Experimental Examples: Evaluation of Physical Properties

The physical properties of the olefin polymers prepared in Examples 1 and 2 and Comparative Examples 1 to 8 were measured by the methods described below and are shown in Table 3.

(1) MI$_{2.16}$ and MFRR (21.6/2.16): Melt Index (MI$_{2.16}$) was measured according to ASTM D1238 (Condition: E, 190° C., load: 2.16 kg). Melt Flow Rate Ratio (MFRR (21.6/2.16)) was calculated by dividing MFR$_{21.6}$ by MFR$_{2.16}$, wherein MFR$_{21.6}$ was measured at a temperature of 190° C. under a load of 21.6 kg according to ISO 1133 and MFR$_{2.16}$ was measured at a temperature of 190° C. under a load of 2.16 kg according to ISO 1133.

(2) Density (g/cm$^3$): The density of the olefin polymer was measured according to ASTM D1505.

(3) MS (Melt Strength): The melt strength of the olefin polymer was measured using Goettfert Rheotens 71.97 equipped with a Model 3211 Instron capillary rheometer. The olefin copolymer melts were discharged through a capillary die (plane die, 180 degree angle) with a ratio (L/D) of 15, wherein the ratio is length (L, 2 mm) to diameter (D, 30 mm). The sample was equilibrated at 190° C. for 10 minutes, and then the piston was moved at a rate of 1 inch/min (2.54 cm/min). The standard test temperature was 19012. The sample was uniaxially pulled using a set of accelerating nips located 100 mm below the die at an acceleration of 1.2 mm/s$^2$. The tension was recorded as a function of the pulling velocity of the nip roll. The melt strength was defined as the Plateau force (mN) before the strands were broken. The measurement conditions are as follows.

Plunger velocity: 0.423 mm/s
capillary: length 30 mm, diameter 2 mm, shear rate 72/s
wheel: initial velocity 18 mm/s, acceleration 12 mm/s$^2$
Diameter of barrel: 9.52 mm
Shear rate: 100~150 average value (4) Measurement of molecular weight and molecular weight distribution (PDI): The weight average molecular weight (Mw) and the number average molecular weight (Mn) of the olefin polymer were measured using a gel permeation chromatography (GPC, manufactured by Water), and the molecular weight distribution (PDI, Mw/Mn) was calculated from the obtained data. The analysis temperature was 160° C., trichlorobenzene was used as a solvent, and the molecular weight was determined by standardizing with polystyrene.

(5) Content of comb polymer, weight average molecular weight of main chain in comb polymer (comb main chain Mw), weight average molecular weight and the number of LCB: Rheological properties and molecular weight distribution of the olefin polymer samples in Examples and Comparative Examples were measured using a rotational rheometer and GPC. As the structural parameters of the sample, the weight ratio (Wt) of the Comb polymer as the branched polymer structure in the olefin polymer, the weight average molecular weight (Mw) of the main chain, and the number of LCB were selected, and a random value of the selected structural parameter was assigned. And then, the rheological properties and molecular weight distribution were predicted from the random value. And, the random value with an error value between the predicted value and the measured value of less than 5% was derived as a determined value. And then, 70 determined values were derived by repeating the process including the steps of assigning a random value, comparing the predicted value with the measured value of the rheological property, and deriving the determined value. The average value of the determined values was written.

(6) Tensile strength and drop impact strength: The polymer prepared in the above Examples and Comparative Examples was subjected to film processing under the following conditions, and the tensile strength according to ASTM D882 and the drop impact strength according to ASTM D1709 were respectively measured.

<Film Processing Conditions>

Blow up ratio (BUR):2.3

Screw rpm: 40 rpm

Processing temperature: 170° C.

Die gap: 2.5 mm

Dies: 100 mm

As shown in the result, it was confirmed that, as in Examples 1 and 2, the processability and physical properties can be simultaneously improved, when the weight average molecular weight of the main chain in comb of the olefin polymer and the weight average molecular weight of LCB are increased, and the content of the comb and the number of LCB are optimized.

The invention claimed is:

1. A preparation method of an olefin polymer, the preparation method comprising the step of polymerizing olefinic monomers in the presence of a supported catalyst,
   wherein the supported catalyst comprises a support, and a first transition metal compound represented by Chemical Formula 1 and a second transition metal compound represented by Chemical Formula 2 which are supported on the support:

[Chemical Formula 1]

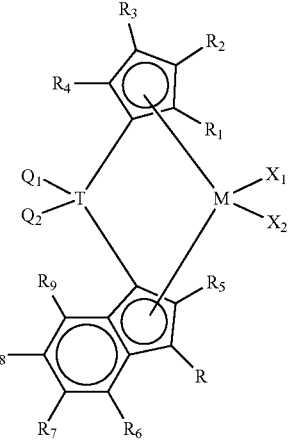

TABLE 3

|  | Example | | Comparative Example | | | | | | | |
| --- | --- | --- | --- | --- | --- | --- | --- | --- | --- | --- |
|  | 1 | 2 | 1 | 2 | 3 | 4 | 5 | 6 | 7 | 8 |
| $MI_{2.16}$ [g/10 min] | 1.33 | 1.30 | 1.15 | 1.19 | 1.03 | 1.12 | 1.31 | 1.21 | 1.30 | 1.20 |
| MFRR (21.6/2.16) | 20.3 | 21.3 | 25.4 | 24.4 | 23.4 | 24.9 | 21.9 | 33.6 | 24.5 | 30.4 |
| Density [g/cm$^3$] | 0.918 | 0.918 | 0.920 | 0.917 | 0.918 | 0.921 | 0.917 | 0.919 | 0.918 | 0.920 |
| Melt strength [mN] | 85 | 89 | 94 | 73 | 62 | 67 | 55 | 69 | 60 | 81 |
| Mw [×10$^3$ g/mol] | 109 | 105 | 123 | 105 | 111 | 113 | 103 | 95 | 107 | 111 |
| PDI | 2.3 | 2.6 | 2.8 | 2.5 | 2.5 | 2.8 | 2.4 | 2.7 | 2.7 | 3.4 |
| Comb wt % | 5.7 | 6.3 | 8.3 | 7.8 | 9.1 | 11.2 | 12.5 | 19.4 | 22.4 | 20.5 |
| Comb main Mw [×10$^3$ g/mol] | 123 | 201 | 546 | 523 | 239 | 546 | 164 | 247 | 242 | 520 |
| LCB Mw [×10$^3$ g/mol] | 17 | 23 | 41 | 23 | 25 | 19 | 22 | 33 | 28 | 38 |
| The number of LCB/1000 C | 0.006 | 0.007 | 0.007 | 0.010 | 0.011 | 0.015 | 0.013 | 0.033 | 0.016 | 0.37 |
| Tensile strength (MD) | 530 | 500 | 490 | 470 | 465 | 450 | 460 | 380 | 400 | 410 |
| Tensile strength (TD) | 520 | 500 | 480 | 465 | 450 | 445 | 450 | 375 | 400 | 400 |
| Drop impact strength | 1020 | 660 | 550 | 600 | 510 | 430 | 560 | 390 | 470 | 520 | in Chemical Formula 1,

M is Ti, Zr or Hf, $X_1$ and $X_2$ are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, T is C, Si, Ge, Sn or Pb, $Q_1$ and $Q_2$ are each independently selected from the group consisting of hydrogen, halogen, a C1 to C20 alkyl group, a C2 to C20 heterocycloalkyl group, a C1 to C20 alkoxy group, a C2 to C20 alkoxyalkyl group, a C1 to C20 carboxylate, and a C2 to C20 alkenyl group, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, and $R_1$ to $R_9$ are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group,

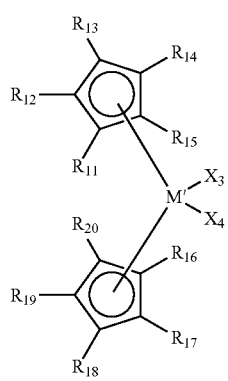

[Chemical Formula 2]

in Chemical Formula 2,

M' is Ti, Zr or Hf, $X_3$ and $X_4$ are each independently selected from the group consisting of halogen, a nitro group, an amido group, a phosphine group, a phosphide group, a C1 to C20 alkyl group, a C1 to C20 alkoxy group, a C2 to C20 alkoxyalkyl group, a silyl group, a C1 to C20 alkylsilyl group, a C2 to C20 alkenyl group, a C6 to C20 aryl group, a C1 to C20 sulfonate group, and a C1 to C20 sulfone group, and $R_{11}$ to $R_{20}$ are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, or one or more pairs of neighboring substituents of $R_{11}$ to $R_{20}$ are optionally connected with each other to form a substituted or unsubstituted aliphatic or aromatic ring.

2. The preparation method of claim 1, wherein in the Chemical Formula 1 of the first transition metal compound, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, $R_1$ to $R_4$ are each independently hydrogen, or a C1 to C20 alkyl group, and $R_5$ to $R_9$ are hydrogen.

3. The preparation method of claim 1, wherein in the first transition metal compound, R is a C1 to C10 alkyl group, $R_1$ to $R_4$ are each independently hydrogen, or a C1 to C10 alkyl group, and $R_5$ to $R_9$ are hydrogen.

4. The preparation method of claim 1, wherein the second transition metal compound is a compound represented by Chemical Formula 2a:

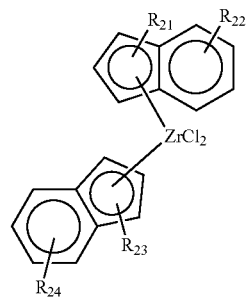

[Chemical Formula 2a]

in Chemical Formula 2a, $R_{21}$ to $R_{24}$ are each independently selected from the group consisting of hydrogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group.

5. The preparation method of claim 1, wherein the support comprises silica, alumina, magnesia, or a mixture thereof.

6. The preparation method of claim 1, wherein the olefinic monomers are ethylene and alpha-olefin.

7. The preparation method of claim 6, wherein the alpha-olefin is selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and a mixture thereof.

8. The preparation method of claim 1, wherein the first transition metal compound is a compound represented by Chemical Formula 1a:

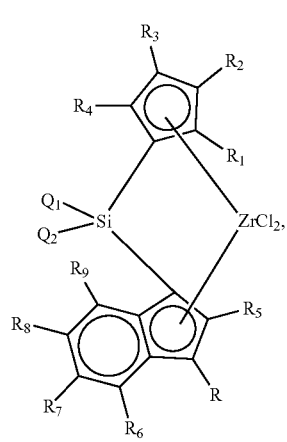

[Chemical Formula 1a]

in Chemical Formula 1a,

Q₁ and Q₂ are each independently selected from the group consisting of hydrogen, a C1 to C10 alkyl group, a C1 to C10 alkoxy group, and a C2 to C10 alkoxyalkyl group, R is selected from the group consisting of a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 silyloxyalkyl group, a C2 to C20 alkenyl group, and a C6 to C20 aryl group, $R_1$ to $R_4$ are each independently a C1 to C10 alkyl group, and $R_5$ to $R_9$ are hydrogen.

9. The preparation method of claim 1, wherein the first transition metal compound is a compound represented by Chemical Formula 1a-1:

[Chemical Formula 1a-1]

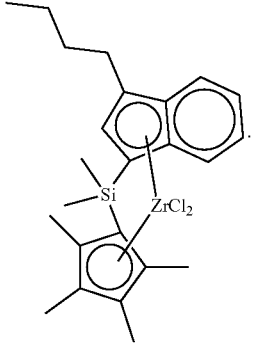

10. The preparation method of claim 1, wherein the second transition metal compound is a compound represented by Chemical Formula 2a-1:

[Chemical Formula 2a-1]

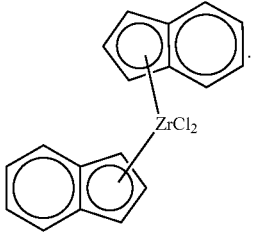

11. The preparation method of claim 1, wherein the second transition metal compound is a compound represented by Chemical Formula 2b:

[Chemical Formula 2b]

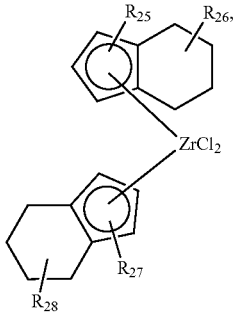

in Chemical Formulae 2b, $R_{25}$ to $R_{28}$ are each independently selected from the group consisting of halogen, a C1 to C20 alkyl group, a C1 to C20 alkoxy group, a C2 to C20 alkoxyalkyl group, a silyl group, a C1 to C20 alkylsilyl group, a C1 to C20 silylalkyl group, a C1 to C20 alkoxysilyl group, a C1 to C20 silyloxyalkyl group, a C2 to C20 alkenyl group, a C6 to C20 aryl group, a C7 to C20 alkylaryl group, and a C7 to C20 arylalkyl group.

12. The preparation method of claim 1, wherein the supported catalyst further comprises a cocatalyst selected from the group consisting of the compounds represented by Chemical Formulae 3 to 5, and a mixture thereof:

$$R_{31}-[Al(R_{32})-O]_n-R_{33}$$ [Chemical Formula 3]

in Chemical Formula 3, $R_{31}$, $R_{32}$ and $R_{33}$ are each independently selected from the group consisting of hydrogen, halogen, a C1 to C20 hydrocarbyl group, and a halogen-substituted C1 to C20 hydrocarbyl group, and n is an integer of 2 or more, $$D(R_{34})_3$$ [Chemical Formula 4]

in Chemical Formula 4,

D is aluminum or boron, and $R_{34}$ are each independently selected from the group consisting of halogen, a C1 to C20 hydrocarbyl group, and a halogen-substituted C1 to C20 hydrocarbyl group, $$[L-H]^+[Z(A)_4]^-\text{ or }[L]^+[Z(A)_4]^-$$ [Chemical Formula 5]

in Chemical Formula 5,

L is a neutral or cationic Lewis base,

H is a hydrogen atom,

Z is a Group 13 element, and

A are each independently selected from the group consisting of a C1 to C20 hydrocarbyl group; a C1 to C20 hydrocarbyloxy group; and substituents in which at least one hydrogen atom of these substituents is substituted with at least one substituent selected from the group consisting of halogen, a C1 to C20 hydrocarbyloxy group and a C1 to C20 hydrocarbylsilyl group.

13. The preparation method of claim 1, wherein the weight ratio of the cocatalyst to the support is 1:1 to 1:100.

14. The preparation method of claim 1, wherein the olefin polymer satisfies the following conditions-:

a density of the olefin polymer: 0.910 g/cm³ to 0.930 g/cm³, a melt index (measured according to ASTM D1238 at a temperature of 190° C. under a load of 2.16 kg) of the olefin polymer: 0.5 g/10 min to 1.5 g/10 min, a melt strength of the olefin polymer measured at 190° C.-: 70 mN or more, MFRR (21.6/2.16) of the olefin polymer, a value that a melt flow rate(MFR$_{21.6}$) measured at a temperature of 190° C. under a load of 21.6 kg according to ISO 1133 is divided by a melt flow rate(MFR$_{2.16}$) measured at a temperature of 190° C. under a load of 2.16 kg according to ISO 1133-: 20 or more and less than 40, and a polydispersity index of the olefin polymer: 2.3 to 3.

15. The preparation method of claim 14, wherein the olefin polymer has the melt strength measured at 190° C. of 70 to 100 mN.

16. The preparation method of claim 14, wherein the olefin polymer has the MFRR (21.6/2.16) of 20 to 30.

17. The preparation method of claim 14, wherein the olefin polymer has the polydispersity index of 2.3 to 2.8.

18. The preparation method of claim 14, wherein the olefin polymer has a weight average molecular weight of 90,000 g/mol to 600,000 g/mol.

* * * * *